United States Patent
LaCroix et al.

(10) Patent No.: US 8,229,099 B2
(45) Date of Patent: Jul. 24, 2012

(54) METHOD AND SYSTEM FOR ROUTING AND RECORDING CALL INFORMATION

(75) Inventors: Jeffrey A. LaCroix, Irving, TX (US); Steven J. Graff, Grapevine, TX (US)

(73) Assignee: E-Talk Corporation, Irving, TX (US)

(*) Notice: Subject to any disclaimer, the term of this patent is extended or adjusted under 35 U.S.C. 154(b) by 912 days.

(21) Appl. No.: 12/276,503

(22) Filed: Nov. 24, 2008

(65) Prior Publication Data

US 2010/0128854 A1 May 27, 2010

(51) Int. Cl.
*H04M 3/00* (2006.01)
(52) U.S. Cl. .............. 379/265.09; 379/88.17; 379/266.1
(58) Field of Classification Search ............. 379/265.01–265.09, 265.01–266.1
See application file for complete search history.

(56) References Cited

U.S. PATENT DOCUMENTS

| | | | |
|---|---|---|---|
| 6,196,846 B1* | 3/2001 | Berger et al. | 434/118 |
| 6,449,251 B1* | 9/2002 | Awadallah et al. | 370/229 |
| 6,711,618 B1* | 3/2004 | Danner et al. | 709/228 |
| 6,748,072 B1* | 6/2004 | McGraw et al. | 379/265.03 |
| 6,801,618 B2* | 10/2004 | Nygren et al. | 379/265.06 |
| 6,804,222 B1* | 10/2004 | Lin et al. | 370/338 |
| 6,944,150 B1* | 9/2005 | McConnell et al. | 370/352 |
| 6,959,078 B1* | 10/2005 | Eilbacher et al. | 379/265.03 |
| 7,092,370 B2* | 8/2006 | Jiang et al. | 370/329 |
| 7,558,382 B2* | 7/2009 | Torres et al. | 379/106.01 |
| 2003/0120813 A1* | 6/2003 | Majumdar et al. | 709/247 |
| 2005/0086468 A1* | 4/2005 | Meandzija et al. | 713/156 |
| 2005/0129211 A1* | 6/2005 | Gallagher et al. | 379/265.02 |

* cited by examiner

*Primary Examiner* — Simon Sing

(57) ABSTRACT

A method comprises receiving a plurality of voice sessions and creating a unique identifier for each of the plurality of voice sessions, wherein each identifier is unique for the duration of its associated voice session. The method also includes assigning the unique identifiers to the associated voice session, and creating a unique data session for each voice session. The method further includes assigning the unique identifier of each voice session to the data session associated with its voice session. The method also includes receiving a plurality of voice sessions and a plurality of data sessions at a manager, and matching one of the plurality of received voice sessions with its associated data session based at least in part on the unique identifier. The method further includes communicating the matched voice session and data session to one of a plurality of agents.

20 Claims, 4 Drawing Sheets

| VOICE | |
|---|---|
| IP ADDRESS | GUID |
| 10.240.224.117 | 1214158372640977902628551598721174645482 |
| 10.240.231.72 | 1096821483953060477190862478675309197327 |
| 10.240.224.45 | 8004603127591428633386224071765282192508 |
| ⋮ | ⋮ |

*FIG. 3A*

| DATA | | |
|---|---|---|
| EXTENSION | DATE | GUID |
| 6703 | 02022007 | 2635707196144230619831492826163077941283 |
| 6795 | 02032007 | 8081923540119780232448608865410027873787 |
| 6818 | 02032007 | 1096821483953060477190862478675309197327 |
| ⋮ | ⋮ | ⋮ |

*FIG. 3B*

| GUID | DATE | TIME | AGENT | ANI | ... |
|---|---|---|---|---|---|
| 1096821483953060477190862478675309197327 | 02032007 | 14:26:31 | TMONROE | 4095552131 | ... |
| 0239164482317542204647135217118390216182 | 02042007 | 09:19:44 | BPARKER | 7855554109 | ... |
| ⋮ | ⋮ | ⋮ | ⋮ | ⋮ | ... |

*FIG. 3C*

METHOD AND SYSTEM FOR ROUTING AND RECORDING CALL INFORMATION

TECHNICAL FIELD

This disclosure relates in general to telecommunications and more particularly to a method and system for routing and recording call information.

OVERVIEW

The use of Internet Protocol in telecommunication systems has created numerous advantages for entities incorporating the technology. However, new challenges may occur when packet switched networks interact with networks employing other technologies, such as circuit switched networks. In certain implementations, the voice portion of a call may need to be matched with data related to the call. The use of different technologies and components produced by different manufacturers can raise difficulties in matching these portions, and also in recording and reproducing calls.

SUMMARY OF EXAMPLE EMBODIMENTS

In accordance with one embodiment of the present disclosure, a method comprises receiving a plurality of voice sessions and creating a unique identifier for each of the plurality of voice sessions, wherein each identifier is unique for the duration of its associated voice session. The method also includes assigning the unique identifiers to the associated voice session, and creating a unique data session for each voice session, wherein each data session comprises data associated with its associated voice session. The method further includes assigning the unique identifier of each voice session to the data session associated with its voice session. The method also includes propagating one or more of the voice sessions and one or more of the data sessions through one or more components. The method also includes receiving a plurality of voice sessions and a plurality of data sessions at a manager, and matching one of the plurality of received voice sessions with its associated data session based at least in part on the unique identifier. The method further includes communicating the matched voice session and data session to one of a plurality of agents.

In accordance with another embodiment of the present disclosure, a system comprises a gateway operable to receive a call and further operable to create and store first call identification information. The system also includes a voice path operable to receive a voice session associated with the call, and further operable to capture the stored first call identification information, the stored first call identification information associated with the voice session. The system further includes a data path operable to capture second call identification information from a data session associated with the voice session, wherein the second call identification information from the data session is identical to the first call identification information. The system also includes a manager operable to match the voice session with the data session based at least in part on the first call identification information from the voice session and the second call identification information from the data session, the manager further operable to communicate the matched voice session and data session to at least one of a plurality of agents.

Numerous technical advantages are provided according to various embodiments of the present disclosure. Particular embodiments of the disclosure may exhibit none, some, or all of the following advantages depending on the implementation. In certain embodiments, a voice session and a data session may be matched together in real-time and sent to an agent handling a call. In other embodiments, a voice session and a data session may be accurately matched and recorded for future reproduction.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIGS. 3A-3C illustrate voice information, data information, and stored information after a voice session has been matched with a data session.

DETAILED DESCRIPTION

Many customer service call centers create and store records of calls from their customers for a variety of purposes. These call centers, however, may use products from different companies and even employ different technologies to handle voice and data information from one or more calls. New solutions are needed to accurately track, transfer, and record some or all of the voice and data information associated with these calls.

In some embodiments, packet-based networking components may interface with circuit-switched networks. Packet-based networks transmit data (including voice and video data) by placing the data in packets and sending each packet individually to a selected destination. Unlike a circuit-switched network, dedicated bandwidth is not required for the duration of a call or fax transmission over a packet-based network. Instead, each telephony device sends packets across the network as they become available for transmission. This feature makes bandwidth available for other data when voice or fax data is not being transmitted. Packet-based networks can thus provide some advantages over circuit-switched networks. However, systems that use both of these technologies may require solutions that ensure the two types of technology interface capably with one another.

Additionally, some systems may use components made by one or more manufacturers. In that case, new solutions may be required to ensure the system exhibits all the functionality expected of the various components. In some systems, voice recordings and data recordings may be compiled separately, and may need to be merged for reproduction. Since some embodiments may have thousands or more active calls at any given time, a solution is needed to determine which data recording corresponds to which voice recording. It can also be advantageous to match the data session and the voice session in real-time, or nearly real-time, so that the information collected may be used by an agent during a call.

Figure 1:
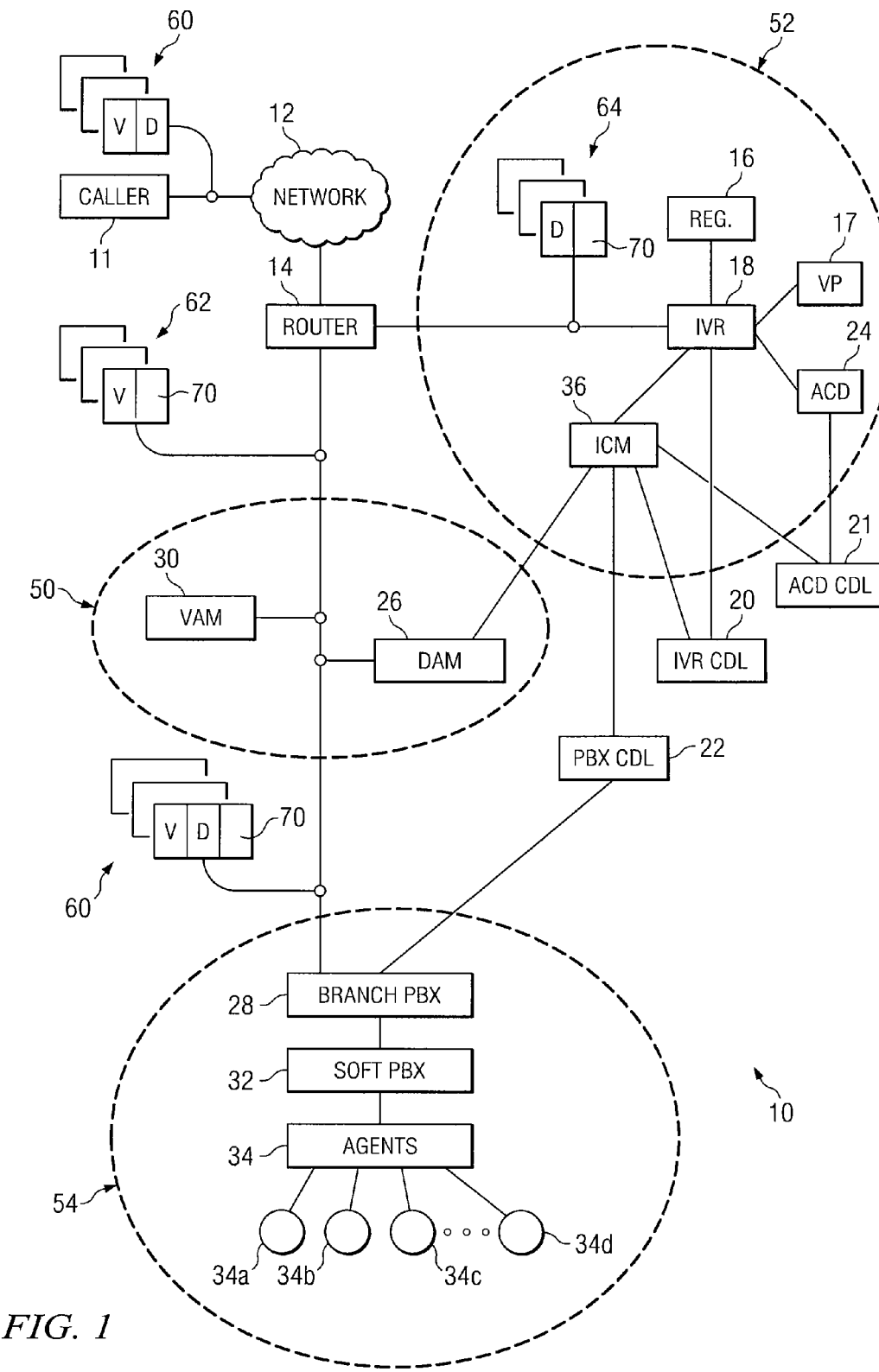
FIG. 1 illustrates an example embodiment of a system for routing and recording call information by matching a voice session with a data session.

As shown in FIG. 1, a call center may receive a plurality of calls 60 at any given time. These calls 60 are transferred through system 10, and a variety of actions may be taken with respect to each call. As one example, a caller 11 may want to talk to an agent 34 to make a change to his or her account. As another example, caller 11 may want to change his or her billing address. Some actions may be accomplished without caller 11 ever talking to an agent 34, such as checking an account balance. In that example, caller 11 can interact with a server such as interactive voice response system (IVR) 18 and retrieve the account balance without speaking with an agent 34.

In some embodiments, data may be collected about the call 60 and/or caller 11 during the call 60. This data can be stored, along with an audio recording of the call 60. If caller 11 speaks to an agent 34, it may also be advantageous for agent 34 to have access to the collected data during the call 60. However, the data may be collected by a number of components in system and stored in various locations in system 10. In addition, the audio portion of the call 60 (known as the "voice session 62") may be routed or stored separately from some or all of the data (the "data session 64") collected. In particular, voice session 62 may pass through all or part of a Voice Recording System 50 (VRS 50) and/or a Branch Call Processing System 54 (BCPS 54) and data session 64 may pass through all or part of an Enterprise Call Processing System 52 (ECPS 52). VRS 50, BCPS 54, and ECPS 52 are merely example configurations of components. In other embodiments, these systems may comprise additional servers or components not shown in FIG. 1. In addition, some of the components shown within these systems in FIG. 1 may be absent in other embodiments. The components shown in one of these systems in FIG. 1 may, in some other embodiments, be located within another of these systems. Also, VRS 50 and BCPS 54 may be considered a voice path, as voice session 62 may pass through all or some of these components. ECPS may be considered a data path, as data session 64 may pass through all or some of these components. In some embodiments, some data may travel through all or part of VRS 50 and/or BCPS 54, and in some embodiments all or part of a voice session may travel through all or part of ECPS 52. For example, call control data may traverse VRS 50 and BCPS 54, and a router or other component may send voice calls to one or more components in ECPS 52, like IVR server 18. Data collected by the components in ECPS 52 may be referred to as "link data" or "system link data" in some embodiments. System 10 may also comprise components that use different technologies, are produced by different manufacturers, or that process, store, and transfer data or voice in different ways. This can make it difficult to accurately route, track, store, and match all or some of the voice session 62 and the data session 64 as they traverse system 10 along with each of the other possibly hundreds or thousands of calls 60 in system 10 at any given time. System 10, therefore, is operable to attach a unique identifier to a voice session 62 and a data session 64 of each call 60 in system 10 and also operable to use that unique identifier to match the voice session 62 of that specific call 60 with the data session 64 of that specific call 60.

System 10 is operable to attach a guaranteed unique identifier 70 (GUID 70) to each voice session 62 and each data session 64 of each call 60 in system 10. That is, for each call 60 in system 10, a component in system 10 attaches a GUID 70 to the voice session 62 of that particular call 60, and may also attach that same GUID 70 to the data session 64 of that particular call 60. Then, when a voice session 62 and a data session 64 of a particular call 60 are split up and sent along separate paths in system 10, the sessions can be matched up again at another point in system 10 by observing their matching GUIDs 70. For a second call 60 in system 10, a second GUID 70 may be generated and attached to both the voice session 62 and the data session 64 of that call 60. Those sessions can then be matched at a later point using that second GUID 70. These steps can be performed for each and every call 60 that enters system 10.

At any given time, system 10 may handle hundreds or thousands of calls 60. As described above, each call 60 has both a voice session 62 and a data session 64 that travel through system 10 and interact with one or more components of system 10. For example, a data session 64 may include information retrieved by a component in system 10, such as caller 11's phone number and/or the number dialed by caller 11. Then, caller 11 may also supply some information to IVR 18, such as the caller's account number. This new information can be added to data session 64. Data session 64 may also comprise data known as link data or system link data. The process of adding data to the data session 64 may continue until the voice session 62 is ready to be sent to an agent 34. In some embodiments, the voice session 62 can also include data, such as call control data, along with the GUID 70. When the voice session 62 is ready to be sent to an agent 34, the voice session 62 and the data session 64 of call 60 can be matched using the GUIDs 70 associated with each session. The voice session 62 and the data session 64 may then be sent to agent 34. Also, the information in data session 64 of a call 60 may be stored in any suitable storage location, and a recording of voice session 62 of that call 60 may also be stored in any suitable location. The GUID 70 assigned to the voice session 62 and the data session 64 may be used to match the stored data session 64 with the stored voice session 62. Once matched, the sessions may be reproduced together at a later time for review.

FIG. 1 illustrates an example embodiment of a system 10 for routing and recording call information. System 10 may include any combination or arrangement of components in software and/or hardware that perform packet-based, circuit switched, or any other form of communicating information. The components of system 10 may be situated in any suitable arrangement and may be connected in any suitable manner. FIG. 1 merely describes one embodiment of system 10, and other configurations will fall within the scope of this disclosure.

A process involving system 10 begins with caller 11 making a call 60. Caller 11 comprises a user attempting to interact with one or more other components of system 10. Any number of callers 11 may call at any given time. A caller 11 interacts with the rest of system 10 through network 12. Network 12 may comprise one or more public circuit-switched telephone networks. Network 12 can comprise a digital system, an analog system, a wireless system, a wireline system, or any combination thereof. In certain embodiments, network 12 may comprise a Voice over Internet Protocol (VOIP) system or any other communication system or combination of communication systems. Network 12 may include switching stations, central offices, mobile telephone switching offices, pager switching offices, remote terminals, and other related telecommunications equipment that are located across the country.

Caller 11 may utilize any device operable to connect to network 12 and interact with other components. For example, caller 11 may use a cellular telephone or a landline telephone. A call 60 from caller 11 may traverse both a voice path comprising VRS 50 and BCPS 54 and a data path comprising ECPS 52 in system 10. The components and function of each path will now be described in further detail.

System 10 may include a VRS 50 and a BCPS 54, which can be considered a voice path. In one embodiment of system 10, VRS 50 comprises voice acquisition module (VAM) 30 and data acquisition module (DAM) 26. The components in VRS 50 are operable to handle the audio portion of the call, voice session 62, as described above. DAM 26 may also be operable to receive and process data associated with the call. Data, such as GUID 70 or other data, may also traverse VRS 50 and BCPS 54. As another example, call control data associated with each call may traverse VRS 50 and BCPS 54.

One or more routers 14 may be coupled to network 12. As used throughout this document, the term "couple" and/or "coupled" refers to any direct or indirect communication between two or more elements, whether or not those elements are in physical contact with one another. Router 14 may comprise any combination of software, hardware, or firmware operable to route and/or forward information, such as calls 60. Router 14 may comprise one or more processors and one or more types of memory. In certain embodiments, router 14 may create the GUID 70 for one or more calls 60 received by router 14. Router 14 may couple to one or more components in ECPS 52. In one example embodiment, router 14 may couple to IVR 18. In other embodiments, router 14 may couple to other components in ECPS 52, like Registrar 16. Router 14 may send calls to one or more components of ECPS 52, VRS 50, or BCPS 54 in some embodiments. Routers may be referred to as gateways in some embodiments.

In some embodiments, GUID 70 may be attached to a Session Initiation Protocol (SIP) header message. SIP is a signaling protocol for multimedia communication sessions, such as Internet telephony calls or multimedia sessions. SIP can establish sessions and modify or terminate them. In VOIP networking, SIP is an alternative approach to signaling using the H.323 protocol standards.

VRS 50 further comprises DAM 26. DAM 26 is operable to monitor and/or record one or more calls 60 or information about calls 60 in system 10. A voice session 62 of call 60 may be recorded for a variety of reasons. For example, a caller 11 may be connected to an agent 34 via network 12, VRS 50, and/or other components of system 10. DAM 26 may monitor the voice session at one or more points along VRS 50. In certain embodiments, DAM 26 may use a tap to tap voice session 62 and retrieve information about voice session 62. The tap may comprise a tap device, a span port, or any other component suitable for retrieving information from voice session 62. In some embodiments, DAM 26 may collect information about call 60. For example, DAM 26 may capture GUID 70 stored in voice session 62. In certain embodiments, GUID 70 may be stored in a SIP header message. This GUID 70 may be used to match a specific voice session 62 or specific data being recorded by DAM 26 with other information about that specific call 60 that is captured by one or more other components in system 10. DAM 26 may also receive information collected in ECPS 52 from one or more components in ECPS 52, such as ICM 36. This information may include, for example, a GUID 70 associated with a data session 64. In one example, DAM 26 may use GUID 70 to match a voice session 62 with a data session 64 of a call 60 so that they both may be recorded and stored together. For example, DAM 26 may receive one or more GUIDs 70 associated with voice sessions 62, and receive one or more GUIDs 70 associated with data sessions 64. DAM 26 may then review the GUIDs 70 for any matches, and match a particular voice session 62 with its corresponding data session 64. DAM 26 may do this for every call 60 in system 10. DAM 26 may also send the matched voice session 62 and data session 64 to an agent 34 to handle the call, either directly or indirectly, through one or more other components of system 10.

VRS 50 also comprises VAM 30. VAM 30 may comprise any combination of hardware and/or software operable to capture and/or maintain voice records. VAM 30 may couple to DAM 26 or any other component of system 10 to receive voice recordings and/or information about voice recordings. VAM 30 may store one or more voice recordings internally or may couple to one or more external databases or other storage units in order to store voice recordings. Data associated with one or more voice recordings may also be stored in VAM 30 or in another database.

System 10 further comprises ECPS 52. In this example embodiment, ECPS 52 comprises servers 16, 17, and 18, along with automatic call distributor (ACD) 24 and Intelligent Call Manager (ICM) 36. ECPS 52 may be considered a data path, where data about a call is created, extracted, stored, or otherwise handled. The components in ECPS 52 may collect information about a call and/or a caller. Some or all of this information comprises the data session 64. The information collected by ECPS 52 may be used by system 10 to route calls, resolve customer issues, or match voice session 62 with data session 64.

System 10 and/or ECPS 52 may comprise either more servers or fewer servers than those shown in FIG. 1. The servers may be coupled to one another or to other components in any suitable arrangement, including arrangements not shown in FIG. 1. Additionally, the servers in system 10 may perform a variety of functions other than those described in this disclosure. The servers in system 10 may be produced by a single company, or they may be manufactured by multiple companies. Some or all of the tasks performed by the servers in system 10 may be performed by a different number of servers than those shown in FIG. 1. Some of the tasks performed by a server in system 10 may be performed by two or more servers in alternative embodiments.

Server 16 may comprise a Registrar. Registrar 16 may provide information about one or more callers 11 that call into system 10. Registrar 16 may also serve as a holding point for calls 60 from one or more callers 11 before the calls 60 are routed to an agent 34 or to another server for further call processing. Calls 60 that reach Registrar 16 may also be sent to router 14 with further routing instructions.

Server 17 may comprise a portal, such as a Voice Portal (VP). VP 17 is operable to provide interactive voice response (IVR) services and/or switching services on VOIP networks. VP 17 may transfer calls 60 or take back transferred calls 60 for additional IVR processing or to send to a network, such as network 12. VP 17 may be compatible with both a PSTN and an Internet Protocol-based network. In some embodiments, VP 17 may attach call identification data, such as GUID 70 from data session 64, to a stored variable, such as an Intelligent Contact Manager's (ICM) Extended Call Variable (ECV). The ECV can be accessed by a component in system 10 to retrieve a GUID 70 attached to a call 60. VP 17 may also transfer calls 60 to Branch PBX 28 or to other components of system 10.

As another example, server 18 may comprise an interactive voice response server. IVR server 18 may be used to handle incoming calls 60 without the use of an operator. IVR server 18 may collect information from one or more callers 11 and store that information for future reference, or use that information to perform one or more tasks. IVR server 18 may also send that information to one or more agents 34 that handle the call 60. IVR server 18 may store this information internally, or may store this information in a database (not shown in FIG. 1) or other storage unit external to IVR server 18. IVR server

18 may also run one or more programs, execute one or more commands, or perform one or more processing functions on data collected from a caller 11. IVR server 18 may record or play back messages, hold calls, or transfer calls to an attached switch, router, network, or other server. As one example, router 14 may send a call 60 to Registrar 16, which then sends the call 60 to IVR server 18. After IVR server 18 has collected sufficient information from the caller, IVR server 18 or another component may determine that the call 60 should be sent to a specific agent 34. IVR server 18 may send those instructions to Registrar 16 and/or router 14, and those components may operate to send the call 60 to the specific agent 34. Collected information or other data may also be sent to the agent 34. Certain procedures may be used to ensure that the agent 34 that receives the call 60 also receives the collected data associated with that call 60.

Server 20 may comprise, for example, an IVR call data link (IVR CDL). IVR CDL 20 may be operable to interface an IVR system, like IVR server 18, to a call manager, like ICM 36. In another embodiment, IVR CDL 20 may interface IVR server 18 to any other appropriate component. IVR CDL 20 may comprise any combination of hardware and/or software operable to facilitate communication between components. In some embodiments, call data links may be referred to as peripheral gateways. Call data links in system 10 may take information from one or more calls so the information may be used by another component.

Server 22 may comprise another call data link, such as a private branch exchange call data link (PBX CDL). PBX CDL 22 is operable to interface one or more servers with a private branch exchange like Branch PBX 22 or any other component, like Soft PBX 32. PBX CDL 22 may comprise any combination of hardware and/or software operable to facilitate communication between components.

ECPS 52 may also comprise server 24. Server 24 may comprise an automatic call distributor (ACD). ACD 24 may comprise a specialized phone system designed to route incoming calls to available agents 34 so that calls 60 are properly and evenly distributed. ACD 24 may comprise any combination of hardware and/or software within one or more physical components. ACD 24 may perform one or more various functions, such as recognizing and answering incoming calls, determining how to handle a particular call, identifying an appropriate agent 34 and queuing the call, and/or routing the call to an agent 34 when the agent 34 is available. ACD 24 may use information about caller 11, such as caller 11's telephone number, or may use information gathered by system 10, such as information collected by IVR server 18, to determine how to route a call 60. ACD 24 may communicate with router 14 or Branch PBX 28, either directly or indirectly, to facilitate handling of incoming calls 60. ACD 24 may also be operable to enable computer-telephony integration (CTI). CTI allows customer contact channels to be integrated, such as integrating voice and data information.

Server 21 may comprise, for example, an ACD call data link (ACD CDL). ACD CDL 21 may be operable to interface an ACD, like ACD 24, to a call manager, like ICM 36. In another embodiment, ACD CDL 21 may interface ACD 24 to any other appropriate component. ACD CDL 21 may comprise any combination of hardware and/or software operable to facilitate communication between components.

Components 16, 17, 18, 20, 21, 22, 24, 36, and any other components that may be present in system 10, may couple to Branch PBX 28 either directly or indirectly to send and/or receive information to and from Branch PBX 28. These components may also couple to other components in system 10. As one example, Branch PBX 28 may communicate with IVR server 18 to retrieve information associated with a call 60 that was collected by IVR server 18. Data session 64, or portions thereof, may be transmitted to Branch PBX 28 from any component of ECPS 52. Components in FIG. 1 may also couple directly or indirectly to DAM 26 or Soft PBX 32 in some embodiments.

System 10 further comprises ICM 36. ICM 36 may comprise hardware, software, or a combination that is operable to observe events associated with a data session 64 of each call 60. ICM 36 may collect information associated with each call 60 and store this information and/or send it to other components of system 10 for use in handling calls 60. In some embodiments, ICM 36 may receive one or more GUIDs 70 associated with voice sessions 62, and send those to DAM 26. ICM 36 may also send other collected information to DAM 26 or to other components in system 10.

System 10 further comprises Branch PBX 28. Branch PBX 28 may comprise any component operable to make connections among phones in an internal network and/or connect phones to an external network, such as network 12. Branch PBX 28 may couple to one or more components of system 10, like router 14, DAM 26, or ICM 36. Branch PBX 28 may comprise IP or time division multiplexing (TDM) technology. Branch PBX 28 may also match additional data about a call 60 (sent from one or more components of system 10) to the call 60 arriving in Branch PBX 28. A call 60 can then be routed to an agent 34 along with some or all of the data associated with the call 60. Some embodiments of system 10 may not include Branch PBX 28.

Soft PBX 32 in system 10 comprises any combination of hardware and/or software operable to route one or more calls 60 to one or more agents 34. Soft PBX 32 may assign the calls 60 to agents 34 in any suitable order, such as assigning incoming calls 60 to the next available agent 34. Some embodiments of system 10 may not include Soft PBX 32.

Agents 34a-34n in system 10 may comprise workstations that may include a telephone, a computer, or any other device that can be used to conduct communications between an agent 34 and one or more callers 11. System 10 may also comprise one or more agents 34 communicating from a remote location in a distributed environment.

In operation, system 10 collects data in a data session 64 about a call 60 and/or caller 11 and matches that data with voice session 62 associated with the call. In certain embodiments, voice session 62 may travel through system 10 through VRS 50 and/or BCPS 54, whereas some data related to call 60 may be collected independently in ECPS 52. Voice session 62 may also be recorded and stored separately from data associated with data session 64. Because of this, system 10 operates to match voice session 62 with data session 64. For example, an agent 34 that receives a call 60 may want to use data associated with call 60 to further assist caller 11. As another example, voice session 62 may be recorded for future reproduction, and it can be advantageous to review data related to call 60 and voice session 62 while also listening to the voice recording of call 60. This can be helpful for quality control, or for resolving disputes involving a caller 11. System 10 is operable to attach a GUID 70 to both a voice session 62 and a data session 64 of a call 60 so that the voice session 62 and the data session 64 may be matched after traveling through system 10.

As discussed above, one solution is to assign a GUID 70 to voice session 62 and the same GUID 70 to a data session 64 associated with voice session 62, and then match voice session 62 and data session 64 using GUID 70. In one embodiment, router 14 can create a GUID 70 for each incoming call 60. For example, router 14 could comprise a Cisco AS5400

Series Universal Gateway, and may be used to create a GUID 70 for each call 60 and store that GUID 70 in a field called "Cisco-Guid" in a SIP header message. The SIP header message is associated with the voice session 62 of call 60, and GUID 70 can be retrieved from the SIP header message by a suitable component in system 10. Voice processor 17 may comprise a Cisco Voice Processor, and may receive a data session 64 associated with the call 60 and attach GUID 70 to an Intelligent Contact Management (ICM) Extended Call Variable (ECV) called User.Media.ID. After this, GUID 70 is stored in both voice session 62 and data session 64 of call 60. At any time during call 60, any suitable component of system 10, such as DAM 26, a manager, or a call manager, can receive one or more voice sessions 62, each identified with an attached GUID 70, and one or more data sessions 64, each identified with an attached GUID 70, and use the GUIDs 70 to match the voice session 62 of a particular call 60 with the data session 64 of that particular call 60. Then, a specific voice session 62 and its associated data session 64 may be sent to an agent 34 to handle the call 60. Additionally, stored voice recordings can be matched with stored data using the GUID 70 associated with each call 60.

Figure 2:
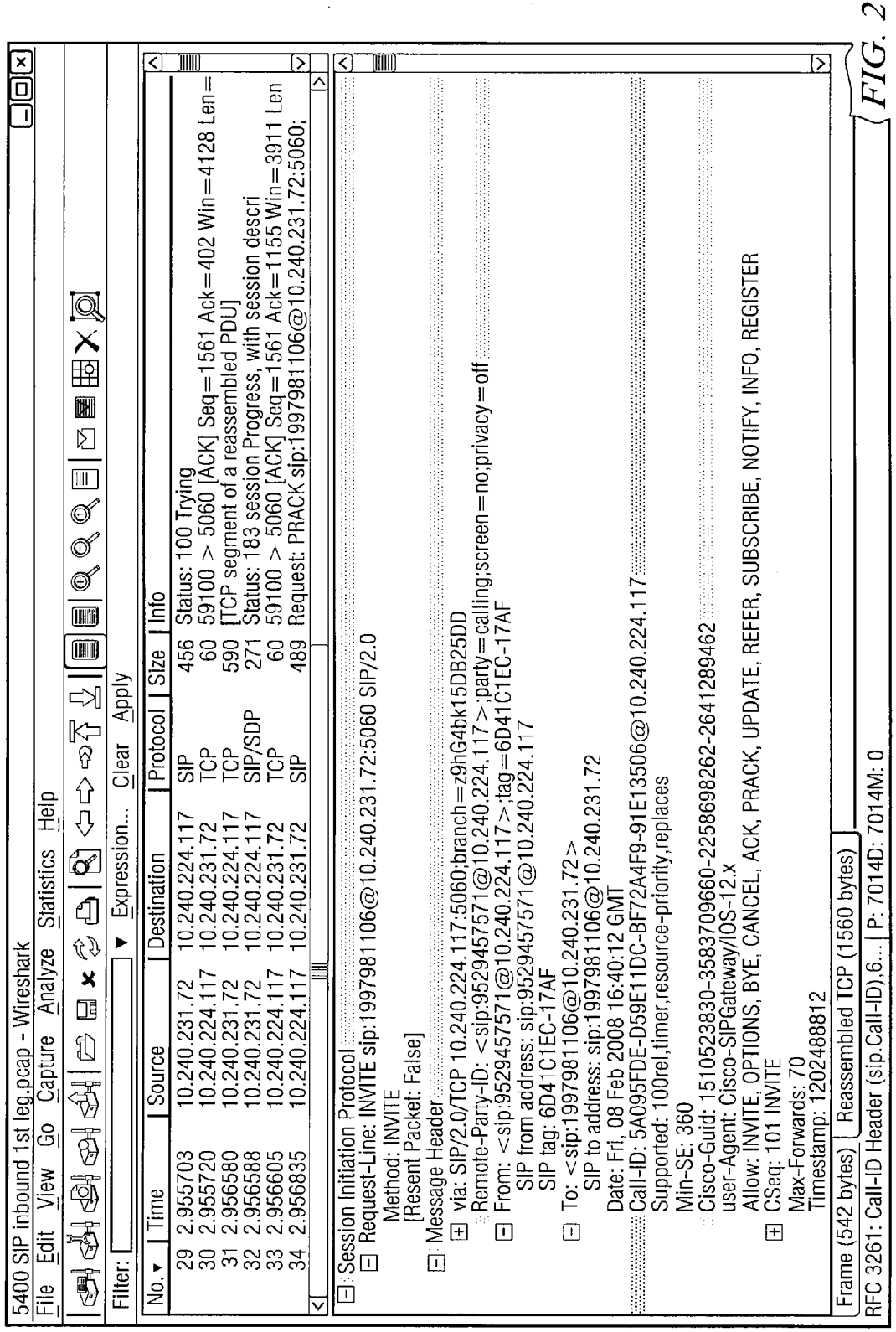
FIG. 2 illustrates one example of call identification information used to match a voice session to a data session.

FIG. 2 illustrates one example embodiment of call identification information used to match a voice session 62 to a data session 64. FIG. 2 comprises a screenshot of some of the information included in a SIP header message. The information in a SIP header message may include, for example, IP addresses, dates and timestamps, and other information. In one example embodiment using Cisco components, the SIP header message also includes a field called "Cisco-Guid," and this field may be used to store a GUID 70. In other embodiments, or using other brands of components, a different field or variable may be used to store a GUID 70. In this example, the GUID 70 stored is a 40-digit base 10 number. In some embodiments, other unique identifiers may be used, and these other unique identifiers may be any length and stored in any base number system. As one example, some embodiments may store the GUID 70 as a hexadecimal number.

FIG. 3A illustrates voice information, FIG. 3B illustrates data information, and FIG. 3C illustrates stored information after a voice session 62 has been matched with a data session 64. FIG. 3A illustrates example voice information that may be stored in system 10. The information in FIG. 3A may be stored in any suitable format, using any hardware or software suitable for storing information. For example, an Oracle database may couple to system 10 and store some or all of the information found in FIGS. 3A to 3C. Some of the information in FIG. 3A, such as the example GUID 70, may be used for matching voice session 62 to data session 64. In this example, an IP address of Branch PBX 28 is stored along with a GUID 70 associated with each call 60. The GUID in this example is a 40-digit unique identifier created by a component of system 10, such as router 14, and assigned to a specific call 60. Each call 60 that reaches router 14 can be assigned a GUID 70. Other voice information besides that shown in FIG. 3A may be stored as well.

FIG. 3B illustrates example data information associated with a call 60 that may be stored in system 10. The information in FIG. 3B may be stored in any suitable format, using any hardware or software suitable for storing information, such as an Oracle database coupled to system 10 (not shown in FIG. 1). The data information in FIG. 3B includes the GUID 70 associated with each call 60 along with other information that may be collected about one or more calls 60. For example, the data information may include the extension that was called by caller 11 and the date of the call 60. Other data information not shown in FIG. 3B may be stored, such as the time of call 60, caller 11's phone number, and/or information collected by an interactive voice response system, such as IVR server 18.

System 10 may use the GUIDs 70 stored in FIGS. 3A and 3B to match a voice session 62 with a data session 64. In certain embodiments, DAM 26 may receive voice session 62 and data session 64 and use the stored GUIDs 70 in each to match each voice session 62 with its respective data session 64. Once matched, the voice session 62 and the data session 64 may be routed to an agent 34 for further call handling. Additionally, some or all of the voice information and/or the data information may be stored for future use.

FIG. 3C illustrates example voice and/or data information associated with a call 60 that may be stored in system 10. Some or all of the voice information and/or data information collected by system 10 may be stored for a variety of purposes other than matching voice session 62 with data session 64. The voice information and/or the data information may be stored in any suitable component of system 10 or component located outside of system 10, using any suitable hardware or software. For example, voice recordings of calls may be stored in VAM 30. FIG. 3C illustrates some example information that may be stored. The GUID 70 used to match a voice session 62 with a data session 64 may be stored, along with a date and time for each call, the names of the one or more agents 34 that handle the calls, and/or a phone number of the caller (labeled "ANI" in FIG. 3C, for Automatic Number Identification). Additional information may be stored in FIG. 3C, such as the caller's account number. Information collected by IVR server 18 may also be stored in FIG. 3C. Any information stored in FIG. 3C, along with any other appropriate information, may be used for a variety of purposes associated with managing a system like system 10, such as determining wait time for callers, determining the average load of system 10, resolving future disputes, or training agents 34. The data in FIG. 3C may also be deleted at any time, including during a call 60. For example, system 10 may no longer need some of the data information once the voice session 62 and the data session 64 of a call 60 have been sent to an agent 34. In that case, system 10 may delete some of the data information even before the call 60 is complete.

Figure 4:
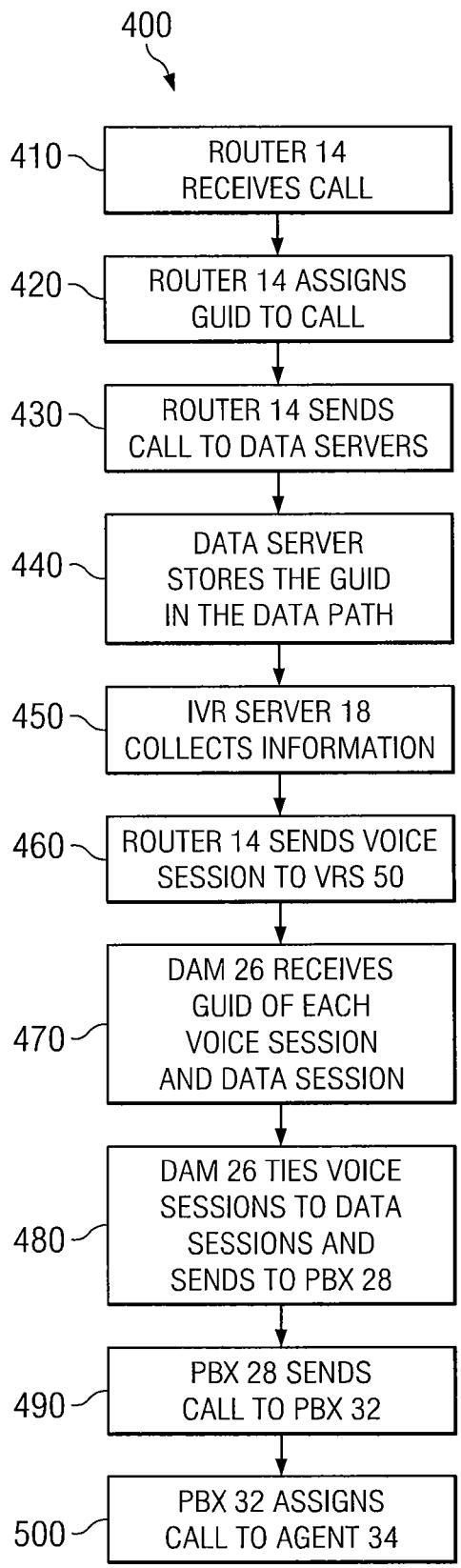
FIG. 4 is a flowchart illustrating one example method of matching a voice session with a data session.

FIG. 4 is a flowchart illustrating one example method 400 of matching a voice session 62 with a data session 64. In particular, the method 400 described may allow a voice session 62 of call 60 and a data session 64 of call 60 to be matched for routing to an agent 34 handling the call 60. Additionally, a recording of voice session 62 and stored data associated with data session 64 may be matched for future reproduction. The steps illustrated in FIG. 4 may be combined, modified, or deleted where appropriate. Additional steps may also be added to the example operation. Furthermore, the described steps may be performed in any suitable order.

FIG. 4 begins with step 410. In step 410, caller 11 makes a call 60, and network 12 connects the call 60 to router 14. Caller 11 may be a customer of a company employing a system like system 10, and caller 11 may be calling to retrieve information about the caller's account with the company. Additionally, system 10 may handle more than one caller 11 at any given time.

In step 420, router 14 assigns a GUID 70 to the call 60. Software within router 14 may be operable to create and assign GUIDs 70 to specific fields or variables within a voice session 62 and/or a data session 64. Router 14 may be operable to assign GUIDs to every call 60 in system 10. The GUIDs 70 are used to tie a voice session 62 and a data session 64 together so that they can be routed to an agent 34 handling the call 60, or so that stored voice sessions 62 and data sessions 64 can be matched. The GUIDs 70 assigned to each call 60 by router 14 are not reused until the call 60 is complete, thus preserving their uniqueness during the call 60. Since the GUIDs 70 are guaranteed unique during the duration of the call 60, voice session 62 and data session 64 can be transferred from one agent 34 to another agent 34 by using the GUID 70. If GUIDs 70 were reused before the call 60 is complete, transferring call 60 between agents 34 along with its associated data information could become more difficult. Also, if GUIDs are reused before the call 60 is complete it may be difficult to determine which voice session 62 is associated with any new data collected using that GUID 70.

In certain embodiments, router 14 receives one or more calls 60. Router 14 can also create a GUID 70 for each call 60 and put the GUID 70 in a SIP header message associated with that call 60. The information in a SIP header message may also include, for example, IP addresses, dates and timestamps, and other information. If router 14 comprises a Cisco AS5400 Series Universal Gateway, the SIP header message for each call 60 may also include a field called "Cisco-Guid," and this field may be used to store the GUID 70 for the call 60.

In step 430, router 14 may send the call 60 to a data server, such as Registrar 16. Registrar 16 may provide information about one or more callers 11. Registrar 16 may also serve as a holding point for calls 60 from one or more callers 11 before the calls 60 are routed to an agent 34 or to another server for further call processing. Registrar 16 may comprise part of the data session 64 of the call 60. In data session 64, data about the caller 11 may be collected and later matched with the voice session 62 using the GUID 70 associated with both the voice session 62 and the data session 64.

In step 440, a server, such as VP 17, may attach the GUID 70 to a stored variable, such as an Intelligent Contact Manager's (ICM) Extended Call Variable (ECV). In some embodiments, this ECV is called User.Media.ID. This step results in the GUID being stored in a component or in components in ECPS 52, which can be referred to as a data path. The GUID 70 stored in the ECV can then be used in system 10 to tie the data session 64 to the voice session 62 of a call 60.

In step 450, IVR server 18 may collect information from caller 11. IVR server 18 may perform a variety of functions in system 10. IVR server 18 may be used to handle incoming calls 60 without the use of an operator. IVR server 18 may collect information from one or more callers 11 and store that information for future reference, or use that information to perform one or more tasks. For example, IVR server 18 may use the collected information to determine which agent 34 will handle the call 60. IVR server 18 may also handle calls 60 without sending them to an agent 34.

In step 460, router 14 sends the voice session 62 to VRS 50. VRS 50 is operable to receive calls in system 10 and collect voice or data information about the calls. Also, in step 460 the GUID 70 associated with the voice session 62 may be retrieved for matching. In some embodiments, DAM 26 may be used to retrieve the GUID 70 from a SIP header message. Also, during step 460 and possibly during other steps, voice session 62 may be recorded by any suitable recording device, such as VAM 30. The voice recording may be stored in VAM 30 or in any other suitable storage location, such as a database external to VAM 30.

In step 470, DAM 26 receives the GUID 70 of each voice session 62 and the GUID 70 of each data session 64. DAM 26 retrieves the GUID 70 from the SIP header message in voice session 62. On the data side, the GUID 70 is observed by ICM 36. ICM 36 can then send the GUID 70 to DAM 26 and DAM 26 can tie a voice session 62 to a data session 64 based on the GUID 70. DAM 26 can perform the tying function in any suitable manner.

In step 480, DAM 26 sends the tied voice session 62 and data session 64 to Branch PBX 28. Branch PBX 28 then has the voice session 62 of the call 60 and data associated with the call 60. Branch PBX 28 is operable to route the call 60 to another component of system 10, such as Soft PBX 32.

In step 490, Branch PBX 28 sends the call 60 to Soft PBX 32. Soft PBX 32 is operable to send the call 60 to an agent 34 for handling. Soft PBX 32 may use any suitable method to determine which agent 34 receives which call 60. Soft PBX 32 may assign the call 60 to the next available agent 34. In other embodiments, Soft PBX 32 may assign the call 60 to an agent 34 based at least in part on information collected about the call 60, such as the identity of the caller 11 or the nature of the call 60.

In step 500, Soft PBX 32 assigns the call 60 to an agent 34. The agent 34 receives the voice session 62 and some or all of the data collected by system 10 for use by agent 34. Agent 34 may use this data to provide service more effectively to caller 11. In addition, in some embodiments agent 34 may transfer the call 60 to another agent 34 for any reason, such as the second agent 34 being better able to handle the call 60. When the call 60 is transferred to another agent 34, data collected by system 10 may also be transferred with the call 60 to the new agent 34 handling the call 60. Additionally, actions taken by one or more agents 34 may also be recorded and stored with the voice session 62 and any data collected by system 10. System 10 can also match voice recordings with data records using the GUID 70.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method, comprising:
receiving a plurality of voice sessions and creating a unique identifier for each of the plurality of voice sessions, wherein each identifier is unique for the duration of its associated voice session;
assigning the unique identifiers to the associated voice session;
creating a unique data session for each voice session, wherein each data session comprises data associated with its associated voice session;
assigning the unique identifier of each voice session to the data session associated with its voice session;
propagating one or more of the voice sessions and one or more of the data sessions through one or more components;
receiving a plurality of voice sessions and a plurality of data sessions at a manager;
matching one of the plurality of received voice sessions with its associated data session based at least in part on the unique identifier; and
communicating the matched voice session and data session to one of a plurality of agents.

2. The method of claim 1, wherein the unique identifier is created by a router.

3. The method of claim 2, wherein the method further comprises storing the unique identifier in a Session Initiation Protocol header message.

4. The method of claim 1, wherein creating a unique data session comprises collecting information using an interactive voice response system.

5. The method of claim 4, wherein communicating the matched voice session and data session to one of a plurality of agents comprises selecting an agent based at least in part on the data associated with the voice session.

6. The method of claim 1, wherein the method further comprises observing the unique identifier of a voice session with a span port.

7. The method of claim 1, wherein the method further comprises recording the matched voice session and data session.

8. The method of claim 7, wherein the method further comprises storing agent information corresponding to the matched voice session and data session.

9. The method of claim 1, wherein the method further comprises transferring the matched voice session and data session from one agent to another agent.

10. A system, comprising:
- a gateway operable to receive a call and further operable to create and store first call identification information;
- a voice path operable to receive a voice session associated with the call, and further operable to capture the stored first call identification information, the stored first call identification information associated with the voice session;
- a data path operable to capture second call identification information from a data session associated with the voice session, wherein the second call identification information from the data session is identical to the first call identification information; and
- a manager operable to match the voice session with the data session based at least in part on the first call identification information from the voice session and the second call identification information from the data session, the manager further operable to communicate the matched voice session and data session to at least one of a plurality of agents.

11. The system of claim 10, wherein the stored first call identification information is stored in a Session Initiation Protocol header.

12. The system of claim 10, wherein the voice path further comprises a tap operable to capture the first call identification information.

13. The system of claim 10, wherein the data path further comprises an interactive voice response system operable to collect information associated with the data session.

14. The system of claim 13, wherein at least some of the information associated with the data session is sent to at least one of the plurality of agents.

15. The system of claim 10, wherein the first call identification information is unique for the duration of the call.

16. The system of claim 10, wherein an agent may transfer the matched voice session and data session to another agent.

17. The system of claim 10, further comprising a database operable to store information related to the voice session or the data session.

18. The system of claim 17, wherein the information is stored based at least in part on the first or second call identification information.

19. The system of claim 10, the system further comprising a voice recording system operable to record one or more voice sessions.

20. A system, comprising:
- a gateway operable to receive a call and further operable to create and store a unique identifier associated with the call in a Session Initiation Protocol header, wherein the unique identifier is unique for the duration of the call;
- a voice path operable to:
  - receive a voice session associated with the call;
  - capture the unique identifier from the Session Initiation Protocol header; and
  - record the voice session;
- a data path operable to:
  - create a data session associated with the call;
  - gather data associated with the call and store it in the data session; and
  - associate the unique identifier with the data session; and
- a manager operable to:
  - match the voice session and the data session based at least in part on the unique identifier; and
  - communicate the matched voice session and data session to at least one of a plurality of agents.

* * * * *